United States Patent
Harrison et al.

(10) Patent No.: US 7,282,249 B2
(45) Date of Patent: Oct. 16, 2007

(54) PADS OF CIGARETTE ROLLING PAPERS

(75) Inventors: Jonathan Harrison, Maidstone (GB); Mark Andrew Rowden, Cambridgeshire (GB)

(73) Assignee: Sustainable Trading Limited, Leeds, Maidstone, Kent (GB)

( * ) Notice: Subject to any disclaimer, the term of this patent is extended or adjusted under 35 U.S.C. 154(b) by 7 days.

(21) Appl. No.: 10/515,158

(22) PCT Filed: May 21, 2003

(86) PCT No.: PCT/GB03/02188

§ 371 (c)(1),
(2), (4) Date: Nov. 8, 2005

(87) PCT Pub. No.: WO03/096827

PCT Pub. Date: Nov. 27, 2003

(65) Prior Publication Data

US 2006/0083886 A1   Apr. 20, 2006

(30) Foreign Application Priority Data

May 21, 2002   (GB) ................... 0211605.1

(51) Int. Cl.
- *B32B 9/00* (2006.01)
- *A24B 1/00* (2006.01)
- *D21H 27/00* (2006.01)

(52) U.S. Cl. ............... 428/40.1; 428/41.8; 131/360; 131/365

(58) Field of Classification Search ............. 428/40.1, 428/41.8, 42.1; 131/360, 365

See application file for complete search history.

(56) References Cited

U.S. PATENT DOCUMENTS

| | | | |
|---|---|---|---|
| 4,290,592 A | | 9/1981 | Kastner |
| 4,661,388 A | * | 4/1987 | Charbonneau ............... 428/43 |
| 5,487,780 A | | 1/1996 | Ritter |
| 5,632,287 A | * | 5/1997 | Hayworth et al. .......... 131/360 |
| 5,762,074 A | | 6/1998 | Garner |
| 6,153,278 A | | 11/2000 | Gravley et al. |
| 6,164,443 A | * | 12/2000 | Mitchell et al. ............ 206/242 |

FOREIGN PATENT DOCUMENTS

| | | |
|---|---|---|
| FR | 787 031 A | 9/1935 |
| FR | 878 236 A | 1/1943 |
| GB | 2318992 | 5/1998 |
| WO | WO91/14621 | 10/1991 |

* cited by examiner

*Primary Examiner*—Patricia L Nordmeyer
(74) *Attorney, Agent, or Firm*—Michael B. Fein; Cozen O'Connor

(57) ABSTRACT

Pads of cigarette papers for making self-rolled cigarettes are provided comprising a stack (1) of cigarette paper sheets (3) adhered to a base sheet (2). Each sheet (3) is adhered by means of an adhesive (7) applied on the bottom side (4) of the sheet, to the top side (6) of the sheet (5) immediately below it in the stack (1). The top side of the sheet (3) may be provided with a further layer of adhesive (10). The invention enables self-rolled cigarette papers, that traditionally have been sold in packets manufactured on customised paper folding and interleaving machines, to be manufactured in pads on machines that may be readily adapted to manufacture other paper products, such as pads of repositionable notes and party hats.

9 Claims, 1 Drawing Sheet

PADS OF CIGARETTE ROLLING PAPERS

CROSS-REFERENCE TO RELATED APPLICATION

This application is a national stage application of PCT/GB03/02188 filed May 21, 2003, which in turn claims benefit of Great Britain application 0211605.1 filed May 21, 2002. All applications are hereby incorporated by reference in their entireties.

The present invention is concerned with pads of cigarette rolling papers. More particularly, the present invention is directed to pads of cigarette rolling papers for use in making self-rolled cigarettes.

Conventional rolling papers that are used to make self-rolled cigarettes are usually sold in packets of folded and interleaved oblong-shaped cigarette paper sheets, wherein one marginal edge of one of the two sides of each sheet is provided with an adhesive, such as a remoistenable gum e.g. gum arabica, to seal the cigarette after it has been rolled. Such rolling papers are normally cut from paper sheets having a weight in the range of from 5 to 40 $g/m^2$.

GB-A-23 18992 discloses an oblong-shaped cigarette rolling paper, intended to be sold in packets of conventionally folded and interleaved sheets, having one of the longer marginal edges and one of the shorter marginal edges on one of the two sides of the paper provided with a gum.

Apparatuses for folding and interleaving continuously moving strips of paper and cutting the interleaved strips into packets of folded and interleaved paper sheets are well known. For example, U.S. Pat. No. 4,290,592 describes such apparatus wherein a supply roll of paper strip is provided for each sheet of paper in a packet, and the strips are simultaneously drawn from the supply rolls and though a series of formers and interleavers to provide a continuously moving strand of interleaved paper strips. The packets are then cut from the continuously moving strand of interleaved paper strips by severing means that moves along with the strand during cutting.

Apparatuses for making packets of folded interleaved cigarette rolling papers tend to be customised pieces of machinery, being unsuitable for making anything other than packets of folded interleaved cigarette rolling papers. As there appear to be no folded interleaved paper products on the market which are required in high volumes and of substantially the same size as cigarette papers, there is no obvious other product that can be manufactured on such apparatus without major modification. Moreover, such apparatuses tends not to be readily adapted for making packets of folded interleaved papers of other significantly different sized paper sheets, for example such as would be used in the manufacture of certain types of boxed tissue papers. Consequently, because the costs of the apparatuses cannot also be used to manufacture other products, this deters new potential manufacturers of conventional cigarette rolling papers from entering the market.

Pads of repositionable paper sheets are items of everyday use in most office environments. Such products are, for example, sold by Minnesota Mining & Manufacturing Company, of St Paul, Minn., USA, under the trade mark "Post-It". Such pads are sold in varying shapes, such as oblong-shaped pads and square-shaped pads, and in varying sizes, such as large-sized pads and small-sized pads. Each pad comprises i) a base sheet having a top side and a bottom side, and ii) a stack of paper sheets comprising an uppermost paper sheet, a lowermost paper sheet and a plurality of paper sheets between said uppermost and lowermost paper sheets, wherein each paper sheet of said stack has a top side facing away from said base sheet and a bottom side facing said base sheet, wherein each paper sheet of said stack is of substantially the same shape and size, wherein the lowermost paper sheet of said stack is adhered to the top side of said base sheet, and wherein at least a portion, usually a marginal edge, of the bottom side of each sheet of said stack located above said lowermost paper sheet is provided with a layer of pressure sensitive adhesive that adheres said sheet to the paper sheet immediately below it. Usually, the repositionable sheets are cut from papers having a weight of 80 g $m^{-2}$ or more.

U.S. Pat. No. 5,487,780 discloses a method and apparatus for applying pressure sensitive adhesive to a substrate, in which the adhesive is deposited on a transfer surface, such as a circulating transfer belt, dried, and subsequently transferred to a plurality of overlapping sheets of paper. The sheets are preferably coated with a primer or a low adhesion backsize, or both, prior to application of the adhesive. The sheets are then stacked to form master pads, which may then be guillotined into individual pads of repositionable paper sheets.

The advantages of the apparatus disclosed in U.S. Pat. No. 5,487,780 are described to be numerous. For example, the coating of supplied sheets of paper with pressure sensitive adhesive stripes is achieved in such a way that the sheets typically do not show any waviness, curling or other deviation from flatness. More particularly, the apparatus permits sheets of various sizes to be coated, limited only by the width of the transport mechanism that conveys the sheets through the apparatus. Thus, aside from the installation of suitable coating and transfer rollers, no other changes in machine parts are needed when the size of the sheets which are to be coated is changed.

WO-A-9102180 discloses a method of wrapping a floral grouping with a sheet of material by placing the floral grouping on a top sheet of material on a pad of sheets of material adhered to each other and then wrapping the top sheet of material about the floral grouping and simultaneously disconnecting the top sheet of material from the pad. The sheet material is constructed from any suitable material that is capable of being wrapped about a floral grouping, such as paper, cellophane, foil, man made organic polymer film, cloth, burlap, and combinations thereof. In a preferred embodiment, the material is constructed from two laminated polypropylene films.

It is the object of the present invention to provide cigarette rolling papers, intended for use in making self-rolled cigarettes, in a format that may be manufactured on apparatuses that may also be readily adapted to manufacture other high volume paper products.

In accordance with a first aspect of the present invention there is provided a pad of cigarette rolling papers comprising i) a base sheet having a top side and a bottom side, and ii) a stack of cigarette papers comprising an uppermost paper, a lowermost paper and a plurality of papers between said uppermost and lowermost papers, wherein each paper of said stack has a top side facing away from said base sheet and a bottom side facing said base sheet, wherein each paper of said stack is of substantially the same shape and size, wherein the lowermost paper of said stack is adhered to the top side of said base sheet, and wherein at least a portion of the bottom side of each paper of said stack located above said lowermost paper is provided with a layer of repositionable pressure sensitive adhesive that adheres said paper to the paper immediately below it.

Preferably, each sheet of cigarette paper in said stack has a weight of from 5 to 40 g/m².

Each sheet of cigarette papers that make up the stack of papers in the pad of the present invention is preferably rectangular or triangular, most preferably oblong. Preferably, at least one marginal edge on the top side of each rectangular or triangular paper is provided with a layer of a second adhesive. More preferably, the papers are oblong-shaped and at least one of the longest marginal edges on the top side of each paper is provided with a layer of second adhesive. When the papers are oblong-shaped and only one of the longest marginal edges of the top side of each paper is provided with a layer of second adhesive, the pressure sensitive adhesive used to adhere the paper to the paper below it is preferably applied to the opposite longest marginal edge on the bottom side of the paper. Preferably the second adhesive is off-set a distance from the very edges of the paper e.g. by from 0.25 to 25 mm, preferably from 1 to 10 mm. The second adhesive is preferably a remoistenable adhesive, such as a water soluble adhesive e.g. gum arabica.

In one particular embodiment, the second adhesive used on the top side of each sheet of substantially rectangular or triangular cigarette paper is a remoistenable gum, e.g. gum arabica, such as the gum found on a conventional cigarette rolling paper. However, in other embodiments of the present invention, it is envisaged that the second adhesive used on the top side of each sheet of cigarette paper may be, for example, a pressure sensitive adhesive which is repositionable and/or which is protected by a removable strip, such as is found on some envelopes. In another embodiment, the second adhesive applied on the top side of the sheet is an adhesive that acts as a contact adhesive with the repositionable pressure sensitive adhesive on the bottom side of the same sheet. In such another embodiment, the adhesive used on the top side of each sheet of rectangular cigarette paper is preferably a pressure sensitive adhesive.

One or both of the repositionable pressure sensitive adhesive and the second adhesive may comprise a colourant, such as a pigment or dye. The colourant may be visible under visible light or only under light of certain wavelengths, such as UV light. Alternatively, the colourant may be a fluorescent material.

One or both of the repositionable pressure sensitive adhesive and the second adhesive may be applied to the papers in the stack in such a manner so as to provide a pattern of adhesive on the paper. Preferably, the repositionable pressure sensitive adhesive is applied in a pattern to the papers in the stack. The pattern may be applied such that it is visible from the opposite side of the paper on which it is applied. The pattern may be an advertisement, picture, slogan, logo or trademark.

Though the repositionable pressure sensitive adhesive is preferably applied at the marginal edge of each paper, to assist separation of the papers during use, it is preferred that the adhesive is off-set a distance, e.g. from about 0.25 to 25 mm, preferably from 1 to 10 mm, from the very edge of the paper. By off-setting the adhesive a short distance from the edge of the paper, it becomes possible for a user to easily lift the top paper, with the use of fingers, from that edge and separate the paper from the remaining stack of papers. In another embodiment, the repositionable pressure sensitive adhesive is positioned away from the marginal regions of the papers e.g. in the central region of the papers.

The repositionable pressure sensitive adhesive may be applied to the same marginal edge of the papers in the stack, so as to provide a pad of cigarette papers held together in the form of a book with a single adhesive spine. Alternatively, the adhesive may be applied on different marginal edges of adjacent papers in the stack. For example, the adhesive may be applied on opposite marginal edges of successive papers, so as to provide a pad of cigarette papers held together in the form of a concertina i.e. .

In a preferred embodiment of the present invention, there is provided a rectangular pad of cigarette papers comprising i) a base sheet having a top side and a bottom side, and ii) a stack of rectangular cigarette papers comprising an uppermost paper, a lowermost paper and a plurality of papers between said uppermost and lowermost papers, wherein each paper of said stack has a top side facing away from said base sheet and a bottom side facing said base sheet, wherein each paper of said stack is of substantially the same shape and size, wherein the lowermost paper sheet of said stack is adhered to the top side of said base sheet, and wherein at least a portion of one of the marginal edges on the bottom side of each paper of said stack located above said lowermost paper sheet is provided with a layer of adhesive that adheres said paper to the paper immediately below it; characterised in that at least a part of the marginal edge on the top side of each paper opposite the marginal edge under which there is adhesive adhering said paper to the paper below is provided with a second layer of adhesive.

Preferably, the adhesive applied to the bottom side of the paper is a pressure sensitive adhesive, more preferably a repositionable pressure sensitive adhesive.

In one embodiment of the present invention, each sheet is preferably provided with a line of perforations close to the layer of adhesive that sticks the papers together, thereby to enable the individual papers, or a major part thereof, to be carefully ripped away from part of the pad where the papers are adhered together, rather than relying on separating the adhered papers. Whilst this embodiment can be used when the adhesive is a repositionable pressure sensitive adhesive, it is preferably employed when the adhesive is a permanent adhesive i.e. when the adhesive is non-repositionable and attempts to separate the individual papers is likely to lead to the papers being accidentally torn.

Preferably the pad is oblong-shaped. Preferably, when the pad is oblong-shaped, the adhesive layers are applied on longitudinal marginal edges of the papers.

In one aspect of this preferred embodiment, the layer of adhesive applied on the top side of each paper is a remoistenable gum, e.g. gum arabica such as found on conventional cigarette rolling papers.

Preferably each sheet of paper in the stack has a weight of from 5 to 40 g/m². Preferably the pads are made of sheets of paper that are substantially the same size and weight as a conventional cigarette rolling paper.

In another aspect of this preferred embodiment, the layer of adhesive applied to the top side of the paper is a pressure sensitive adhesive. Preferably, the paper has a weight of from 5 to 40 g/m².

In accordance with another embodiment of the present invention, there is provided a pad of cigarette rolling papers, for making self-rolled cigarettes, comprising i) a base sheet having a top side and a bottom side, and ii) a stack of sheets of oblong-shaped or triangular-shaped cigarette paper comprising an uppermost sheet, a lowermost sheet and a plurality of sheets between said uppermost and lowermost paper sheets, wherein each sheet of cigarette paper in said stack has a top side facing away from said base sheet and a bottom side facing said base sheet, wherein each sheet of said stack is of substantially the same oblong-shape or triangle-shape and size, wherein the lowermost paper sheet of said stack is adhered to the top side of said base sheet, wherein at least a portion of one marginal edge on the bottom side of each sheet of said stack located above said lowermost paper sheet is provided with a layer of adhesive that adheres said sheet to the paper sheet immediately below it. Preferably the pads are made of sheets of paper that are substantially the same size and weight as a conventional cigarette rolling paper. Preferably, each sheet of paper in said stack has a weight from 5 to 40 $g/m^2$. Preferably, the adhesive that adheres said sheet to the paper sheet immediately below it is a repositionable pressure sensitive adhesive.

In another aspect, the present invention provides a method of making a self-rolled cigarette, the method comprising a) separating a cigarette paper from a pad of cigarette papers as described above, b) placing an appropriate amount of tobacco in the central region of the top side of the paper, c) lifting an edge of the paper and rolling it towards another edge of the paper such that edges overlap with the pressure sensitive adhesive applied on the bottom side of one edge going under the top side of the other edge, and d) applying light pressure along the overlapping region to seal the tobacco inside the rolled cigarette paper.

Preferably, at least a part of a marginal edge on the top side of each sheet of paper is provided with a second layer of adhesive.

Preferably, the sheets of paper are oblong-shaped. Preferably, at least a portion of one of the longitudinal marginal edges on the bottom side of each sheet of said stack located above said lowermost paper sheet is provided with a layer of pressure sensitive adhesive that adheres said sheet to the paper sheet immediately below it. Preferably, at least a part of the longitudinal marginal edge on the top side of each sheet of paper opposite the longitudinal marginal edge under which there is pressure sensitive adhesive adhering said sheet to the sheet below is provided with a second layer of adhesive.

Preferably, the layer of adhesive applied on the top side of each sheet is a remoistenable gum, e.g. gum arabica such as found on conventional cigarette rolling papers but it may also be any other adhesive including a pressure sensitive adhesive or a contact adhesive with the adhesive on the bottom side of the sheet.

Whilst the sheets of paper in each of the above embodiments of each aspect of the present invention may generally be of a rectangular or triangular shape, one or more of the marginal edges of such sheets may be cut into fancy or decorative shapes. For example, a saw shaped edge.

Preferably, unless stated otherwise, in each of the above embodiments of each aspect of the present invention, the adhesive that is used to adhere one sheet of paper to a sheet of paper immediately below it in the stack is a pressure sensitive adhesive, more preferably a repositionable pressure sensitive adhesive.

The present invention advantageously enables cigarette rolling papers to be manufactured on non-customised machinery. For example, the machinery described in U.S. Pat. No. 5,487,780 is suitable for making pads of cigarette rolling papers as well as pads of repositionable paper sheets commonly used in offices. Accordingly, more paper product manufactures are now able to offer manufacture of cigarette rolling papers in their product range.

Persons skilled in the art of making pads of paper will readily be able to manufacture the pads of the present invention. For example, all pads that are embodiments of the present invention may be manufactured employing machinery such as described in U.S. Pat. No. 5,487,780. When the top side of each sheet is provided with an adhesive, such as a remoistenable gum e.g. gum arabica, such an adhesive is preferably applied to the paper before it processed in the machinery. Alternatively, the adhesive may be applied to the papers during the manufacture of the pads. Such an "in-line" process can be carried out in a conventional manner.

Pads of the present invention may comprise stacks of paper sheets wherein the sheets have a decorative finish Suitable decorative finishes include one or more decorative images selected from the group consisting of patterns, scenic views, portraits, photographic images, and cartoon characters, such as typically found on conventional wrapping papers. Decorative finishes may also be selected from one or more of advertisements, company names, slogans, trademarks and logos, price lists, product information, maps, route directions, and time tables. The inks used to make the images on the sheets of paper are preferably non-toxic, this is particularly so when the pads are pads of cigarette rolling papers or intended for other human consumption applications.

The pads of the present invention may be made from flavoured and/or scented papers, such as chocolate, coffee, mint or banana. The flavourings or scents used to make such papers are preferably non-toxic, this is particularly so when the pads are pads of cigarette rolling papers or intended for other human consumption applications.

In another embodiment, the flavourings and/or scents may be carried in one or more of the adhesives, such as in the repositionable pressure sensitive adhesive that adheres the papers together and/or in the second adhesive. A person skilled in the relevant art can readily formulate such flavourings and/or scents into the adhesives.

In another aspect of the present invention, there is provided the use of cigarette paper in the preparation of a pad of papers. The pads produced by such use are as described above.

In another aspect, there is provided a method for rolling a self-rolled cigarette, which method comprises separating or ripping a cigarette paper from a pad of cigarette papers as described above and rolling a cigarette using the paper. Preferably, the paper comprises a second adhesive which is a remoistenable gum and the cigarette is rolled in a conventional manner.

The invention enables self-rolled cigarette papers, that traditionally have been sold in packets manufactured on customised paper folding and interleaving machines, to be manufactured in pads on machines that may be readily adapted to manufacture other paper products, such as pads of repositionable notes and party hats.

Various embodiments of the invention are now further explained with reference to the drawings, wherein.

Figure 1:
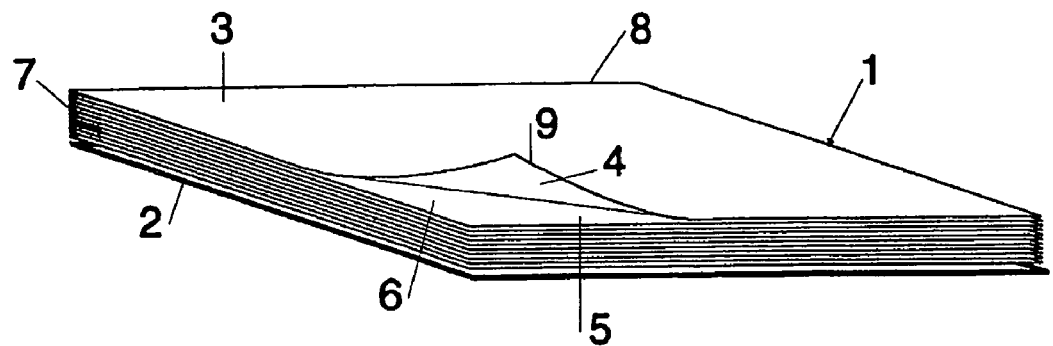
FIG. 1 is a schematic perspective view of a pad according to one embodiment of the present invention.

In FIG. 1, a pad of paper, which is manufactured employing the machinery disclosed in U.S. Pat. No. 5,487,780, comprises a stack 1 of cigarette paper sheets, each sheet weighing approximately 18 $g/m^2$, adhered to a based sheet 2. The bottom side 4 of each sheet 3 is adhered to the top side 6 of the sheet 5 immediately below it by a repositionable pressure sensitive adhesive 7 applied along the marginal edge 8 of the bottom side of the sheet 3. The uppermost sheet 3 may be pulled away from sheet below it 5 by lifting the marginal edge 9.

To make a self-rolled cigarette, the sheet 3 is pulled away from the stack 1. An appropriate amount of tobacco is placed in the central region of the top side of the sheet. Then the marginal edges 8 and 9 are lifted and rolled towards each other such that the pressure sensitive adhesive applied on the bottom side of marginal edge 8 goes under the top side of marginal edge 9. Light pressure is then applied along the overlapping region to seal the tobacco inside the roll of cigarette paper.

Figure 2:
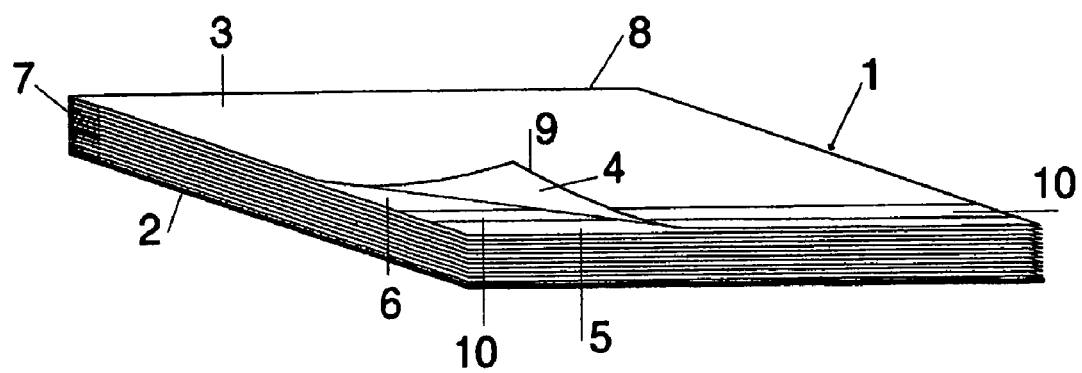
FIG. 2 is a schematic perspective view of a preferred embodiment of a pad according to another embodiment of the present invention.

In FIG. 2, a pad of paper, which is manufactured employing the machinery disclosed in U.S. Pat. No. 5,487,780, comprises a stack 1 of cigarette paper sheets, each sheet weighing approximately 18.30 g/m², adhered to a based base sheet 2. The bottom side 4 of sheet 3 is adhered to the top side 6 of the sheet 5 immediately below it by a repositionable pressure sensitive adhesive 7 applied along the marginal edge 8 of the bottom side of the sheet 3. A layer of gum arabica 10, which is applied to the paper before the paper is formed into the pad, is applied along the marginal edge 9 on the top side 6 of each sheet. The uppermost sheet may be pulled away from sheet below it by lifting the marginal edge 9.

To make a self-rolled cigarette, the sheet 3 is pulled away from the stack 1. An appropriate amount of tobacco is placed in the central region of the top side of the sheet. Then the marginal edges 8 and 9 are lifted and rolled towards eachother such that the pressure sensitive adhesive applied on the bottom side of marginal edge 8 goes under the top side 6 of marginal edge 9. The line of gum arabica 10 is then wetted by tongue and then light pressure applied along the roll of paper to make a seal along the line of gum arabica.

Figure 3:
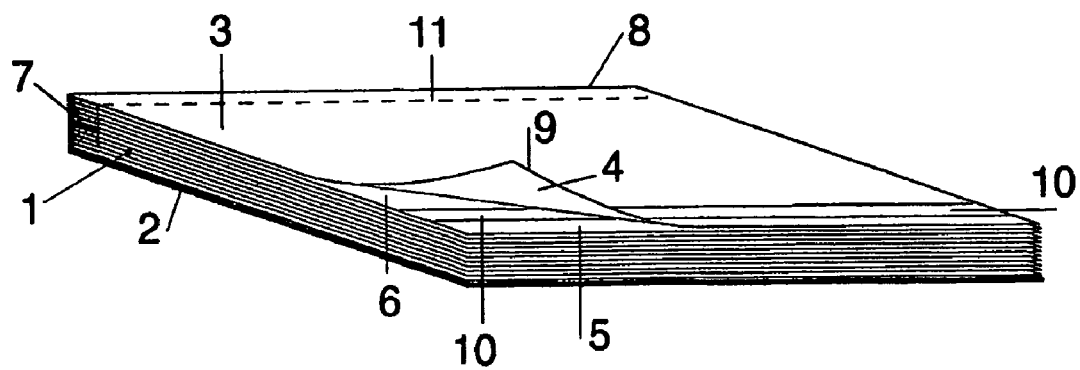
FIG. 3 is a schematic perspective view of a pad of cigarette papers according to another embodiment of the present invention.

In FIG. 3, a pad of cigarette papers as illustrated in FIG. 2 is provided with a line of perforations 11 to enable the portion of the sheet adhered to the sheet below to be torn away from the remainder of the sheet.

The invention claimed is:

1. A sheet of cigarette rolling paper suitable for forming a self-rolled cigarette, the sheet of cigarette rolling paper having a weight of from 5 to 40 g/m², a top side and a bottom side, wherein a portion of the bottom side is provided with a layer of repositionable pressure sensitive adhesive having properties suitable for moisture-free adhering of said portion of the bottom side to the top side of the paper when the paper is formed into a cigarette by rolling the paper around tobacco.

2. The sheet of cigarette rolling paper of claim 1 wherein the portion of the bottom side is offset 0.25 to 25 mm from an edge.

3. A cigarette formed the cigarette rolling paper of claim 1.

4. A pad of self-adhering cigarette rolling papers for making self-rolled cigarettes comprising i) a base sheet having a top side and a bottom side, and ii) a stack of cigarette rolling papers comprising an uppermost cigarette rolling paper, a lowermost cigarette rolling paper and a plurality of cigarette rolling papers between said uppermost and lowermost cigarette rolling papers, wherein each paper of said stack has a top side facing away from said base sheet and a bottom side facing said base sheet, wherein each paper of said stack is of substantially the same shape and size, each cigarette rolling paper having a weight of from 5 to 40 g/m², wherein the lowermost paper of said stack is adhered to the top side of said base sheet, and wherein at least a portion of the bottom side of each paper of said stack located above said lowermost paper is provided with a layer of repositionable pressure sensitive adhesive that adheres said sheet to the paper immediately below it and is suitable for moisture-free adhering of said portion of the bottom side to the top side of the same paper when the paper is separated from the pad and formed into a cigarette by rolling the paper around tobacco.

5. The pad of cigarette rolling papers of claim 4, wherein the pad comprises i) a base sheet having a top side and a bottom side, and ii) a stack of rectangular cigarette papers comprising an uppermost paper, a lowermost paper and a plurality of papers between said uppermost and lowermost papers, wherein each paper of said stack has a top side facing away from said base sheet and a bottom side facing said base sheet, wherein each paper of said stack is of substantially the same shape and size, wherein the lowermost paper of said stack is adhered to the top side of said base sheet, and wherein at least a portion of one of the marginal edges on the bottom side of each paper of said stack located above said lowermost paper is provided with a layer of adhesive that adheres said paper to the paper immediately below it; characterized in that at least a part of the marginal edge on the top side of each paper opposite the marginal edge under which there is adhesive adhering said paper to the paper below is provided with a second layer of adhesive.

6. The pad of cigarette rolling papers of claim 4 comprising i) a base sheet having a top side and a bottom side, and ii) a stack of oblong-shaped or triangle-shaped cigarette papers comprising an uppermost sheet, a lowermost sheet and a plurality of sheets between said uppermost and lowermost paper sheets, wherein each sheet of cigarette paper in said stack has a top side facing away from said base sheet and a bottom side facing said base sheet, wherein each sheet of said stack is of substantially the same oblong-shape or triangle-shape and size, wherein the lowermost paper sheet of said stack is adhered to the top side of said base sheet, wherein at least a portion of one marginal edge on the bottom side of each sheet of said stack located above said lowermost paper sheet is provided with a layer of adhesive that adheres said sheet to the paper sheet immediately below it.

7. The pad of claim 4 wherein the sheets of cigarette paper have a decorative finish.

8. The pad of claim 4 wherein the sheets of paper and/or at least one adhesive is/are flavoured and/or scented.

9. The pad of claim 4, wherein each cigarette paper in the stack is formed from cigarette paper having a weight of from 10 to 25 g m$^{-2}$.

* * * * *